(12) United States Patent
Terada et al.

(10) Patent No.: US 8,147,745 B2
(45) Date of Patent: Apr. 3, 2012

(54) PROCESS FOR PRODUCING FIBER AND METHOD FOR PRODUCING CATALYST LAYER

(75) Inventors: Ichiro Terada, Chiyoda-ku (JP); Seigo Kotera, Chiyoda-ku (JP); Katsuya Fujii, Chiyoda-ku (JP); Hiroyuki Watabe, Chiyoda-ku (JP); Hiroshi Uyama, Suita (JP); Chie Matsubara, Suita (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/578,693

(22) Filed: Oct. 14, 2009

(65) Prior Publication Data

US 2010/0096769 A1  Apr. 22, 2010

(30) Foreign Application Priority Data

Oct. 17, 2008 (JP) ................. 2008-268726

(51) Int. Cl.
  *D01D 5/04* (2006.01)
  *D01D 5/12* (2006.01)
  *D01F 1/09* (2006.01)
  *D01F 6/12* (2006.01)
  *D04H 3/02* (2006.01)

(52) U.S. Cl. ........ 264/555; 264/103; 264/104; 264/205; 264/210.8

(58) Field of Classification Search .......... 264/103, 264/104, 105, 172.11, 172.12, 172.13, 172.14, 264/172.15, 205, 206, 207, 208, 210.7, 210.8, 264/465, 555

See application file for complete search history.

(56) References Cited

U.S. PATENT DOCUMENTS

| 3,426,117 | A  | * | 2/1969 | Shimoda et al. ..... 264/172.11 X |
| 4,039,634 | A  | * | 8/1977 | Couchoud .............. 264/210.8 X |
| 5,744,090 | A  | * | 4/1998 | Jones et al. ............... 264/104 X |
| 2005/0073075 | A1 | * | 4/2005 | Chu et al. ..................... 264/465 |

FOREIGN PATENT DOCUMENTS

| JP | 2001-185163 | 7/2001 |
| JP | 2002-110202 | 4/2002 |
| JP | 2002-155421 | 5/2002 |

OTHER PUBLICATIONS

U.S. Appl. No. 13/194,241, filed Jul. 29, 2011, Terada, et al.

* cited by examiner

*Primary Examiner* — Leo B Tentoni
(74) *Attorney, Agent, or Firm* — Oblon, Spivak, McClelland, Maier & Neustadt, L.L.P.

(57) ABSTRACT

To provide a process whereby an ultrafine fiber of a fluorinated ion exchange resin can be produced easily at low cost, and a method whereby a catalyst layer having a high gas diffusion property can be produced easily at low cost.

A process for producing a fiber by spinning a spinning solution containing a fluorinated ion exchange resin and a solvent by a dry spinning method, or producing an electrically conductive composite fiber by spinning n types (where n is an integer of at least 2) of spinning solutions, of which at least one type contains a fluorinated ion exchange resin and a solvent, and at least one type contains an electrically conductive material and a solvent, simultaneously by a dry spinning method, wherein the spinning solution which is being spun by the dry spinning method, is stretched by a gas stream; and a method for producing a catalyst layer, which comprises accumulating the fiber produced by such a process to form a non-woven fabric thereby to obtain a catalyst layer having the non-woven fabric.

17 Claims, 9 Drawing Sheets

PROCESS FOR PRODUCING FIBER AND METHOD FOR PRODUCING CATALYST LAYER

BACKGROUND OF THE INVENTION

1. Field of the Invention

The present invention relates to a process for producing a fiber and a method for producing a catalyst layer for a membrane/electrode assembly for a polymer electrolyte fuel cell.

2. Discussion of Background

As a process for forming a fiber, a process is known which comprises discharging a spinning solution from a discharge nozzle and evaporating a solvent of the spinning solution to form a fiber (Patent Document 1).

Further, as a polymer electrolyte fuel cell, one provided with a membrane/electrode assembly having a polymer electrolyte membrane disposed between two electrodes each having a catalyst layer, is known.

The polymer electrolyte fuel cell is required to provide a high energy efficiency and a high output density under an operation condition to provide high hydrogen and oxygen utilization rates.

In order for a polymer electrolyte fuel cell to satisfy such requirements, the gas diffusion in a catalyst layer is particularly important among key elements constituting the cell.

Conventional membrane/electrode assemblies are produced, for example, by the following methods.

(i) A method wherein a liquid mixture having a catalyst and a fluorinated ion exchange resin dissolved or dispersed in a solvent such as an alcohol (such as ethanol) is directly applied to the surface of a polymer electrolyte membrane to form a catalyst layer.

(ii) A method wherein such a liquid mixture is applied to a substrate film to form a catalyst layer, and such a catalyst layer is transferred or bonded to the surface of a polymer electrolyte membrane.

However, a membrane/electrode assembly obtainable by such a method is inadequate in the formation of pores in the catalyst layer, and the gas diffusion in the catalyst layer is low. Accordingly, when the polymer electrolyte fuel cell provided with such a membrane/electrode assembly is used at a high current density, the output voltage tends to decrease.

As a method for producing a membrane/electrode assembly having a catalyst layer having a high gas diffusion property, the following methods have been proposed.

(1) A method wherein from a liquid mixture having a catalyst and a fluorinated ion exchange resin dispersed or dissolved in a solvent, the solvent is removed to prepare particles having an average particle size of from 0.1 to 100 μm, such particles are applied on the surface of a polymer electrolyte membrane and press-bonded under heating to form a catalyst layer (Patent Document 2).

(2) A method wherein a catalyst and a fluorinated ion exchange resin are added to a solvent containing an alcohol (such as ethanol) and a fluorinated alcohol to prepare a liquid mixture, and a catalyst layer is formed by using such a liquid mixture (Patent Document 3).

However, even the catalyst layer formed by the method (1) or (2), was inadequate in the gas diffusion property. Further, the fluorinated alcohol is expensive as compared with a usual alcohol, and it must be recovered when it is evaporated by drying the coated film of the liquid mixture.

Patent Document 1: JP-A-2002-155421
Patent Document 2: JP-A-2001-185163
Patent Document 3: JP-A-2002-110202

SUMMARY OF THE INVENTION

It is an object of the present invention to provide a process for producing an ultrafine fiber of a fluorinated ion exchange resin easily at low cost, and a method for producing a catalyst layer having a high gas diffusion property easily at low cost.

The process for producing a fiber of the present invention is a process for producing a fiber by a spinning method which comprises discharging a spinning solution containing a fluorinated ion exchange resin and a solvent from a discharge nozzle, and evaporating the solvent from the discharged spinning solution, wherein the spinning solution which is being spun by the above spinning method, is stretched by a gas stream.

It is preferred that the above spinning solution further contains an electrically conductive material.

Further, the process for producing a fiber of the present invention is a process for producing an electrically conductive composite fiber by a spinning method which comprises discharging n types (where n is an integer of at least 2) of spinning solutions, of which at least one type contains a fluorinated ion exchange resin and a solvent, and at least one type contains an electrically conductive material and a solvent, simultaneously from discharge nozzles, and evaporating the solvents from the discharged n types of spinning solutions, wherein the n types of spinning solutions which are being combined and spun by the above spinning method, are stretched by a gas stream.

The above electrically conductive material is preferably a catalyst containing a metal.

The method for producing a catalyst layer of the present invention is a method for producing a catalyst layer for a membrane/electrode assembly for a polymer electrolyte fuel cell, which comprises accumulating the fiber produced by the process of the present invention to form a non-woven fabric thereby to obtain a catalyst layer having the non-woven fabric.

According to the process for producing a fiber of the present invention, it is possible to produce an ultrafine fiber easily at low cost.

According to the method for producing a catalyst layer of the present invention, it is possible to produce a catalyst layer having a high gas diffusion property easily at low cost.

DETAILED DESCRIPTION OF THE PREFERRED EMBODIMENTS

Figure 1:
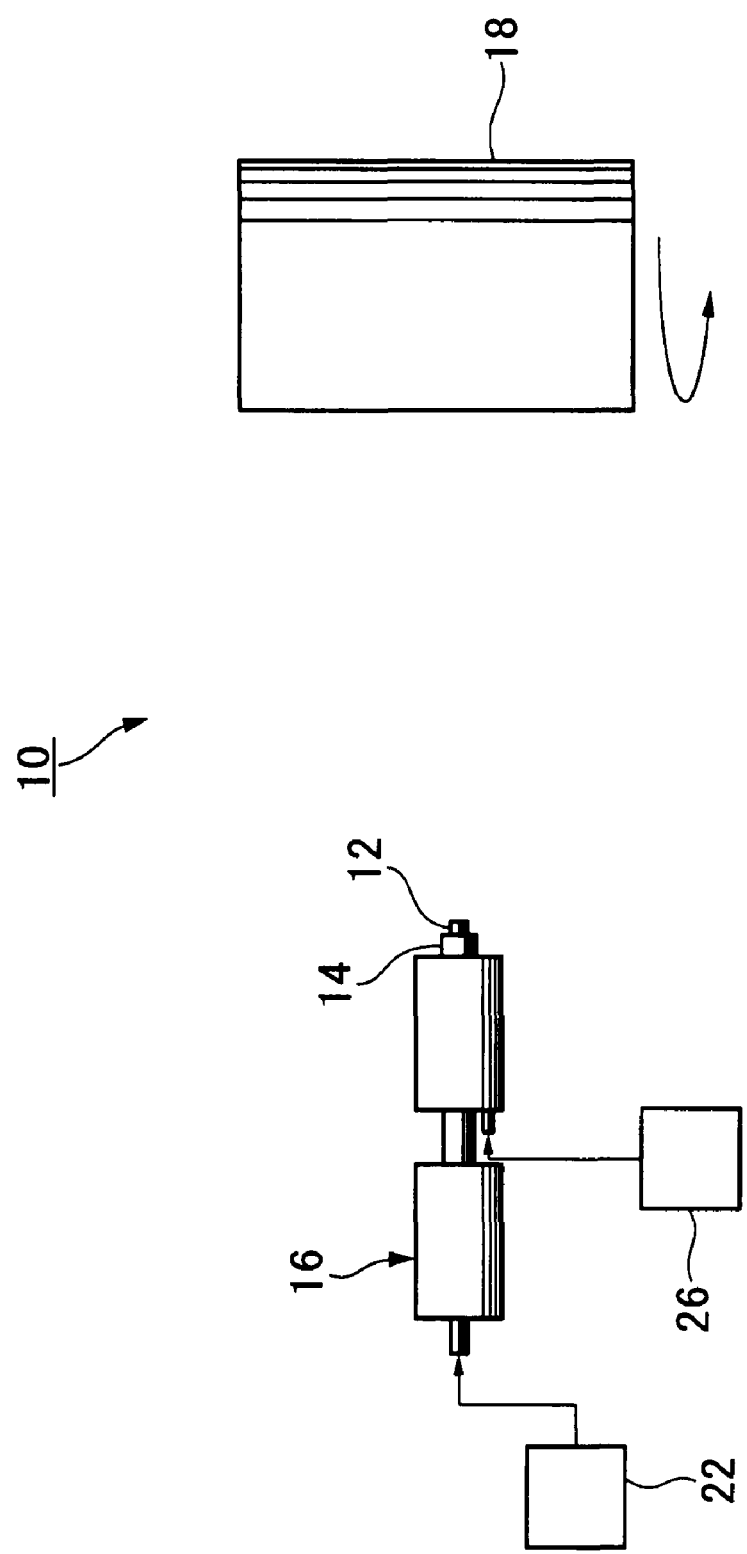
FIG. 1 is a structural view illustrating an example of an apparatus for producing a fiber to be used for the process of the present invention.
Figure 2:
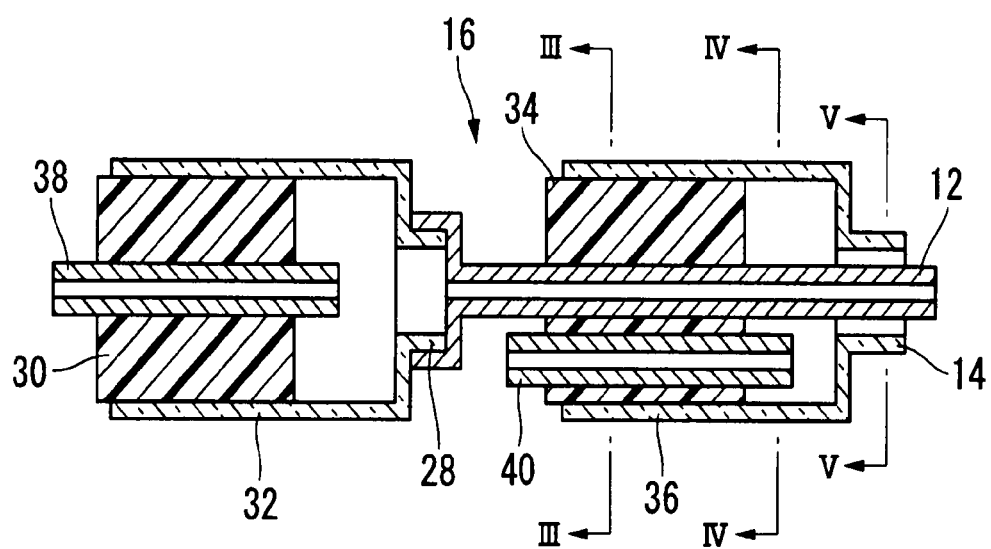
FIG. 2 is a cross-sectional view illustrating a spinning nozzle in the apparatus in FIG. 1.
Figure 3:
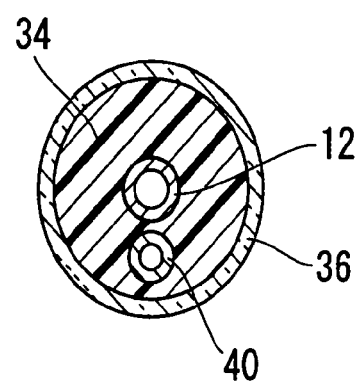
FIG. 3 is a cross-sectional view along III-III in the spinning nozzle in FIG. 2.
Figure 4:
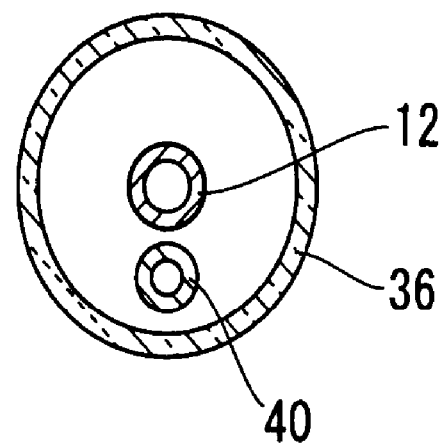
FIG. 4 is a cross-sectional view along IV-IV in the spinning nozzle in FIG. 2.
Figure 5:
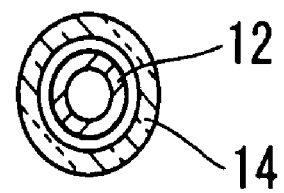
FIG. 5 is a cross-sectional view along V-V in the spinning nozzle in FIG. 2.

In the present specification, repeating units represented by the formula (1) will be referred to as units (1). Repeating units represented by other formulae will also be referred to in the same manner.

Further, in the present specification, a compound represented by the formula (2) will be referred to as compound (2). Compounds represented by other formulae will also be referred to in the same manner.

Process for Producing Fiber

The process for producing a fiber of the present invention is a process wherein a spinning solution is stretched by a gas stream at the same time as it is spun by a spinning method (hereinafter sometimes referred to as a dry spinning method) which comprises discharging the spinning solution from a discharge nozzle and evaporating the solvent from the discharged spinning solution.

The process for producing a fiber of the present invention may be the following process (I) or (II).

(I) A process which is a process for producing a fiber by spinning a spinning solution containing a fluorinated ion exchange resin and a solvent by the dry spinning method, wherein the spinning solution which is being spun by the dry spinning method, is stretched by a gas stream.

(II) A process which is a process for producing an electrically conductive composite fiber by spinning n types (where n is an integer of at least 2) of spinning solutions, of which at least one type contains a fluorinated ion exchange resin and a solvent and at least one type contains an electrically conductive material and a solvent, simultaneously by the dry spinning method, wherein the n types of spinning solutions which are being combined and spun by the dry spinning method, are stretched by a gas stream.

Gas Stream Stretching

The spinning solution which is being spun by the dry spinning method means the spinning solution discharged from the discharge nozzle and one having the spinning solution spun and having a part of its solvent evaporated (i.e. a fiber precursor).

The direction of the gas stream to stretch the spinning solution which is being spun may be any direction so long as it is a direction to stretch the spinning solution discharged from the discharge nozzle, and it may be parallel or oblique to the discharge direction of the spinning solution from the discharge nozzle. With a view to efficiently stretching the spinning solution which is being spun and suppressing scattering of the fiber, the direction of the gas stream to stretch the spinning solution which is being spun, is preferably substantially parallel to the discharge direction of the spinning solution from the discharge nozzle. It is thereby possible to prevent scattering of the fiber around the device thereby to further increase the spinning efficiency, whereby the cost can be reduced as a whole.

The gas as a source for the gas stream may, for example, be air or an inert gas (nitrogen, argon, helium or the like). From the viewpoint of costs, air is preferred, and an inert gas is preferred. Further, a pressurized gas is preferred from such a viewpoint that a high speed gas stream is formed, and the spinning solution which is being spun can thereby be efficiently stretched.

The dry spinning method is a spinning method to evaporate the solvent form the spinning solution, and it is also preferred to use a gas which assists the drying of the fiber. Accordingly, the gas as a source for the gas stream may have the humidity controlled, or the gas as a source for the gas stream may be heated to a proper temperature.

The dry spinning method having the gas stream stretching combined, has the following characteristics.

(i) A non-woven fabric can be produced by a simple apparatus as compared with other methods.

As a method for producing a non-woven fabric by using a molten resin, a melt blown method or a spun bond method is, for example, known, and as a method for producing a non-woven fabric by using a fiber formed by a melt spinning method, a paper making method may, for example, be known. However, in each case, a large scale apparatus for producing a non-woven fabric will be required, or to prepare a raw material fiber, a separate fiber-producing apparatus is required, thus requiring installation costs.

(ii) An ultrafine fiber can be obtained.

In order to produce a non-woven fabric constituted by an ultrafine fiber by means of a usual spinning installation, the production conditions will have to be strictly set, and there will be many restrictions, such as the viscosity, stretchability, etc. of the raw material. Whereas, the dry spinning method having the gas stream stretching combined, is a spinning method using a solution, whereby a volume shrinkage takes place in its drying process, and the raw material itself has a low viscosity, whereby spinning by an ultrafine nozzle is possible, and an ultrafine fiber can easily be obtained.

(iii) The accumulated product of the fiber is obtained usually in the form of a non-woven fabric wherein fibers are bonded to one another.

In the dry spinning method having the gas stream stretching combined, solidification from the solution and spinning by stretching take place simultaneously or sequentially, whereby the accumulated product of the fiber is obtainable in the form of a non-woven fabric wherein fibers are bonded to one another.

(iv) A fiber substantially containing an electrically conductive material can be formed.

As a method for forming a non-woven fabric by a spinning method using a solution, an electrical field spinning method is known. As is different from such an electrical field spinning method, in the dry spinning method having the gas stream stretching combined, it is unnecessary to apply a voltage. In the electrical field spinning method, electrical discharge, breakage of the fiber accompanying it, etc. are likely to occur when a fiber containing an electrically conductive material is to be formed, and therefore, it is practically difficult to form a fiber which substantially contains an electrically conductive material. Whereas, in the dry spinning method having the gas stream stretching combined, no such troubles will occur, and it is possible to form a fiber which substantially contains an electrically conductive material.

Process (I)

FIG. 1 is a structural view illustrating an example of an apparatus for producing a fiber to be used for the process (I). An apparatus 10 for producing a fiber comprises a spinning nozzle 16 provided with a discharge nozzle 12 and a gas blowing nozzle 14, a rotatable drum 18 (collector) disposed to face the discharge nozzle 12, a pump 22 to supply a spinning solution to the spinning nozzle 16, and a pump 26 to supply a gas to the spinning nozzle 16.

As shown in FIGS. 2 to 5, the spinning nozzle 16 comprises a bottomed cylindrical first syringe 32 having a discharge outlet 28 formed at its forward end and having its base end sealed with a silicon cap 30; a bottomed cylindrical second syringe 36 disposed coaxially with the first syringe 32 so that its base end faces the forward end of the first syringe 32, having a gas blowing nozzle 14 formed at its forward end and having its base end sealed by a silicon cap 34; a tubular discharge nozzle 12 having its base end connected to the discharge outlet 28 of the first syringe 32, passing through the silicon cap 34 of the second syringe 36 and through the space in the second syringe 36 and the gas blowing nozzle 14 and having its forward end projected from the forward end of the gas blowing nozzle 14; a spinning solution supply tube 38 to supply the spinning solution to a space in the first syringe 32; and a gas supply tube 40 to supply the gas to a space in the second syringe 36.

The discharge nozzle 12 and the gas blowing nozzle 14 are disposed concentrically so that the outermost side be the gas blowing nozzle 14, the discharge nozzle 12 be disposed inside the gas blowing nozzle 14, and a gas flow channel be formed to let a gas flow in a space between the gas blowing nozzle 14 and the discharge nozzle 12. Further, the forward end of the discharge nozzle 12 located inside, is projected beyond the forward end of the outermost gas blowing nozzle 14. By such a disposition, when a gas is blown out from the gas blowing nozzle 14, a gas stream will be formed which is substantially parallel to the discharge direction of the spinning solution discharged from the discharge nozzle 12.

The production of a fiber by means of the fiber production apparatus 10 is carried out as follows.

Firstly, the drum 18 is rotated. The pump 22 is operated to supply a spinning solution to a space in the first syringe 32 through the spinning solution supply tube 38 and to let the spinning solution be discharged at a constant speed from the forward end of the discharge nozzle 12, of which the base end is connected to the discharge outlet 28 at the forward end of the first syringe 32. At the same time, the pump 26 is operated to supply a pressurized gas to a space in the second syringe 36 through the gas supply tube 40 and to let the pressurized gas be blown out from the gas blowing nozzle 14 at the forward end of the second syringe 36 thereby to let a gas stream be formed substantially in parallel with the discharge direction of the spinning solution discharged from the discharge nozzle 12.

When the frictional force between the spinning solution discharged from the discharge nozzle 12 and the gas in contact with the spinning solution, exceeds the surface tension of the spinning solution, the spinning solution undergoes a deformation into a conical shape so-called a Taylor cone at the forward end of the discharge nozzle 12, and further, a forward end of the cone will be stretched. The stretched spinning solution is further stretched and slimmed by the gas stream formed by the gas blown out of the gas blowing nozzle 14. From the slimmed spinning solution, the solvent is instantaneously evaporated by the gas stream, whereby an ultrafine fiber is formed. The formed fiber is transported by the gas stream and will adhere to the drum 18, whereby the fiber is less likely to scatter around the apparatus, and the deposition efficiency can be improved. The fiber will gradually accumulate on the rotating drum 18, whereby a non-woven fabric constituted by the continuous fiber, will be formed on the drum 18.

Further, by the air stream substantially parallel to the discharge direction of the spinning solution discharged from the discharge nozzle 12, the fiber is readily directed towards the drum 18, whereby the fiber is less likely to scatter around the apparatus, and the deposition efficiency can be further increased. It is thereby possible to reduce the cost as a whole. Further, by the air stream, the fiber will be accumulated without irregularities on the drum 18, whereby a uniform non-woven fabric can readily be formed.

As the spinning solution in the process (I), a spinning solution (a) containing a fluorinated ion exchange resin and a solvent, is used.

The spinning solution (a) is a solution or dispersion having a fluorinated ion exchange resin dissolved or dispersed in a solvent.

The fluorinated ion exchange resin may, for example, be a perfluorocarbon polymer having sulfonic acid groups (hereinafter referred to as a sulfonic acid type perfluorocarbon polymer).

The sulfonic acid type perfluorocarbon polymer is preferably polymer (H) or polymer (Q), particularly preferably polymer (Q).

Polymer (H):

Polymer (H) is a copolymer having units based on tetrafluoroethylene (hereinafter referred to as TFE) and units (1).

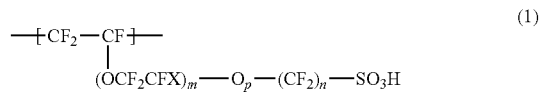
(1)

wherein X is a fluorine atom or a trifluoromethyl group, m is an integer of from 0 to 3, n is an integer of from 1 to 12, and p is 0 or 1.

Polymer (H) is obtained by polymerizing a mixture of TFE and a compound (2) to obtain a precursor polymer (hereinafter referred to as polymer (F)), and then converting —SO$_2$F groups in the polymer (F) to sulfonic acid groups. The conversion of —SO$_2$F groups to sulfonic acid groups is carried out by hydrolysis and treatment for conversion to acid form.

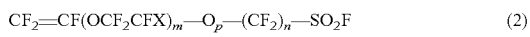
(2)

wherein X is a fluorine atom or a trifluoromethyl group, m is an integer of from 0 to 3, n is an integer of from 1 to 12, and p is 0 or 1.

As the compound (2), compounds (21) to (23) are preferred.

(21)

(22)

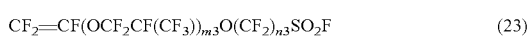
(23)

wherein each of n1, n2 and n3 is an integer of from 1 to 8, and m3 is an integer of from 1 to 3.

Polymer (Q):

Polymer (Q) is a copolymer having units based on TFE and units (U1).

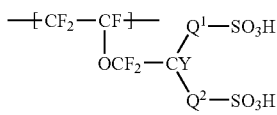

(U1)

wherein $Q^1$ is a perfluoroalkylene group which may have an etheric oxygen atom, $Q^2$ is a single bond or a perfluoroalkylene group which may have an etheric oxygen atom, and Y is a fluorine atom or a monovalent perfluoroorganic group.

The single bond means that the carbon atom of CY and the sulfur atom of $SO_3H$ are directly bonded.

The organic group means a group having at least one carbon atom.

In a case where a perfluoroalkylene group for $Q^1$ or $Q^2$ has an etheric oxygen atom, such an oxygen atom may be one or more. Further, such an oxygen atom may be inserted between a carbon atom-carbon atom bond in a perfluoroalkylene group, or may be inserted at a carbon atom bond terminal.

The perfluoroalkylene group preferably has from 1 to 6 carbon atoms and may be linear or branched.

The unit (U1) is preferably a unit (M1), more preferably a unit (M11) or (M12).

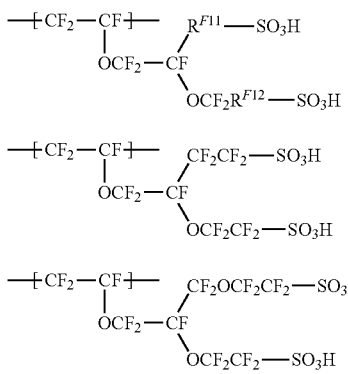

wherein $R^{F11}$ is a single bond or a $C_{1-6}$ linear perfluoroalkylene group which may have an etheric oxygen atom, and $R^{F12}$ is a $C_{1-6}$ linear perfluoroalkylene group.

Polymer (Q) may further contain repeating units based on other monomers (hereinafter referred to as other units).

As other monomers, from the viewpoints of the mechanical strength and chemical durability, repeating units based on a perfluoromonomer are preferred, and repeating units based on the above-mentioned unit (1) having a functional group, or repeating units based on the unit (M2) are preferred. The unit (M2) is more preferably a unit (M21) or a unit (M22):

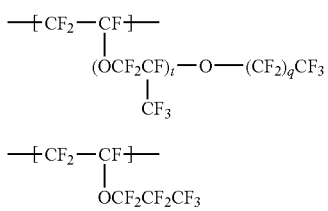

-continued

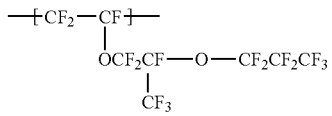

(M22)

wherein t is an integer of from 0 to 5, and q is an integer of from 1 to 12.

EW of polymer (Q) is preferably from 400 to 900 g dry resin/equivalent (hereinafter referred to as g/equivalent), more preferably from 500 to 800 g/equivalent.

The mass average molecular weight of polymer (Q) can be evaluated by measuring the TQ value. The TQ value (unit: ° C.) is an index for the molecular weight of the polymer and is a temperature at which the amount of extrusion becomes 100 $nm^3$/sec, when the polymer is subjected to melt-extrusion under an extrusion pressure condition of 2.94 MPa using a nozzle having a length of 1 mm and an inner diameter of 1 mm. For example, a polymer having a TQ value of from 200 to 300° C. corresponds to a mass average molecular weight of from $1 \times 10^5$ to $1 \times 10^6$, although it may vary depending upon the composition of repeating units constituting the polymer.

From the viewpoint of the electrical conductivity and gas diffusion property, the ion exchange capacity of the fluorinated ion exchange resin is preferably from 1.1 to 1.8 meq/g dry resin, more preferably from 1.25 to 1.65 meq/g dry resin.

The spinning solution (a) preferably further contains an electrically conductive material. The electrically conductive material may, for example, be an electrically conductive filler (such as a metal powder, carbon black, carbon nanotubes, carbon nanowalls, carbon nanocoils, etc.), an electrically conductive resin or a catalyst containing a metal. In a case where the fiber is used in a catalyst layer for a membrane/electrode assembly for a polymer electrolyte fuel cell, a catalyst containing a metal (a catalyst containing a metal may hereinafter simply be referred to as a catalyst) is preferred.

The catalyst is preferably a catalyst having a metal supported on a carbon carrier.

The carbon carrier may, for example, be a carbon black powder, and from the viewpoint of durability, a carbon black powder graphitized by e.g. heat treatment is preferred.

The specific surface area of the carbon carrier is preferably from 50 to 1,500 $m^2$/g. When the specific surface area of the carbon carrier is in such a range, the metal can be supported on the carbon carrier with good dispersability, and the electrode reaction activities will be stabilized for a long period of time.

The metal is preferably platinum or a platinum alloy.

Platinum or a platinum alloy is highly active for a hydrogen oxidation reaction at an anode and for an oxygen reduction reaction at a cathode. Further, in the form of a platinum alloy, the stability or activity as a catalyst may sometimes be further imparted.

The platinum alloy is preferably an alloy of platinum with at least one metal selected from the group consisting of platinum group metals other than platinum (i.e. ruthenium, rhodium, palladium, osmium and iridium), gold, silver, chromium, iron, titanium, manganese, cobalt, nickel, molybdenum, tungsten, aluminum, silicon, zinc and tin. The platinum alloy may contain an intermetallic compound of platinum with a metal which can be alloyed with platinum.

From the viewpoint of the durability, a catalyst for a cathode is preferably a catalyst having a platinum-cobalt alloy supported on a carbon carrier.

The solvent may be one which is capable of dissolving or dispersing the fluorinated ion exchange resin and is preferably one which can easily be evaporated. In a case where an electrically conductive material is contained, and the electrically conductive material is a catalyst, it is preferred to use a mixed solvent of water with an organic solvent having a hydroxy group.

The organic solvent having a hydroxy group is preferably an organic solvent having from 1 to 4 carbon atoms in its main chain, and it may, for example, be methanol, ethanol, n-propanol, isopropanol, tert-butanol or n-butanol. As the organic solvent having a hydroxy group, one type may be used alone, or two or more types may be used as mixed.

The proportion of water is preferably at least 10 mass %, more preferably at least 20 mass %, in the mixed solvent (100 mass %). The proportion of water may be 100 mass %, but is preferably at most 99 mass %, more preferably at most 80 mass %. When the proportion of water is at least 10 mass %, the fiber can easily be formed. When the proportion of water is at most 99 mass %, the viscosity of the spinning solution can easily be adjusted.

Further, in a case where an electrically conductive material is contained, and the electrically conductive material is a catalyst, the proportion of the total of the fluorinated ion exchange resin and the catalyst is preferably from 1 to 30 mass %, more preferably from 5 to 15 mass %, in the spinning solution (a) (100 mass %), with a view to obtaining a proper viscosity level. Further, the mass ratio of the fluorinated ion exchange resin to the catalyst (i.e. polymer/catalyst) in the spinning solution (a) is preferably from 0.2 to 4.0. When the mass ratio is within such a range, the electrical conductivity and gas diffusion property of the catalyst layer will be good.

The spinning solution (a) preferably further contains a polyalkylene oxide (hereinafter referred to as PAO), since the fiber can thereby be constantly formed. PAO is preferably polyethylene oxide (hereinafter referred to as PEO). The molecular weight of PEO is preferably at least 100,000, more preferably at least 200,000. And, the molecular weight of PEO is preferably at most 10,000,000, more preferably at most 8,000,000, further preferably at most 5,000,000.

In a case where the spinning solution (a) contains the fluorinated ion exchange resin and PAO, the proportion of PAO is preferably at least 0.01 mass %, more preferably at least 3 mass %, in the spinning solution (a) (100 mass %). And, the proportion of PAO is preferably at most 30 mass %, more preferably at most 10 mass %. When the proportion of PAO is within such a range, the fiber can be formed constantly.

The viscosity of the spinning solution (a) is preferably at least 100 mPa·s, more preferably at least 200 mPa·s. And, the viscosity is preferably at most 5,000 mPa·s, more preferably at most 2,500 mPa·s. When the viscosity of the spinning solution (a) is within such a range, the fiber can easily be formed.

The viscosity of the spinning solution is measured at 25° C. by using a TV-20 model viscometer (manufactured by Toki Sangyo Co., Ltd.) provided with a cone plate type (rotor code: 0.1, rotor No.: 1° 34'×R24).

The discharge amount of the spinning solution (a) is preferably at least 0.5 mL/hr, more preferably at least 1 mL/hr. And, the discharge amount of the spinning solution (a) is preferably at most 20 mL/hr, more preferably at most 10 mL/hr. When the discharge amount of the spinning solution (a) is at least 0.5 mL/hr, the discharge nozzle 12 is less likely to be clogged, and the fiber is less likely to be broken. When the discharge amount of the spinning solution (a) is at most 20 mL/hr, a fine fiber can be formed.

The blowoff amount of the gas is preferably at least 0.5 L/min, more preferably at least 3.5 L/min. And, the blowoff amount of the gas is preferably at most 100 L/min, more preferably at most 50 L/min. When the blowoff amount of the gas is at least 0.5 L/min, the gas with a volume ratio of at least 1,000 will exert a stretching action to the spinning solution, whereby an adequate stretching effect can be expected. If the blowoff amount of the gas exceeds 100 L/min, the stretching effect tends to be too strong, whereby the stretched one tends to be broken, and it tends to be difficult to obtain a continuous fiber.

The inner diameter of the forward end of the discharge nozzle 12 is preferably at least 0.05 mm, more preferably at least 0.1 mm. And, such an inner diameter is preferably at most 2 mm, more preferably at most 1 mm. When the inner diameter of the forward end of the discharge nozzle 12 is at least 0.05 mm, the discharge nozzle 12 is less likely to be clogged. When the inner diameter of the forward end of the discharge nozzle 12 is at most 2 mm, a fine fiber can be formed.

The inner diameter of the forward end of the gas blowing nozzle 14 is preferably larger by from 0.1 to 2.0 mm, more preferably from 0.1 to 1.0 mm, than the outer diameter of the forward end of the discharge nozzle 12. When the inner diameter of the forward end of the gas blowing nozzle 14 is within such a range, the spinning solution which is being spun by the dry spinning method, can be efficiently stretched by the gas stream.

The distance from the forward end of the discharge nozzle 12 to the drum 18 is preferably at least 3 cm, more preferably at least 5 cm. And, such a distance is preferably at most 30 cm, more preferably at most 20 cm. When such a distance is at least 3 cm, evaporation of the solvent can be carried out sufficiently. And when such a distance is at most 30 cm, the fiber can be easily accumulated.

Process (II)

The process (II) is preferably the following process (II-1), whereby the structure of the spinning nozzle will not be complex, and a fiber can be formed constantly.

(II-1) A process which is a process for producing a fiber having a core-in-sheath structure by spinning two types of spinning solutions, of which at least one type contains a fluorinated ion exchange resin and a solvent and at least one type contains an electrically conductive material and a solvent, by a dry spinning method by disposing one of them at the core portion and the other at the sheath portion, whereby the two types of spinning solutions which are being spun by the dry spinning method, are stretched by a gas stream.

Figure 6:
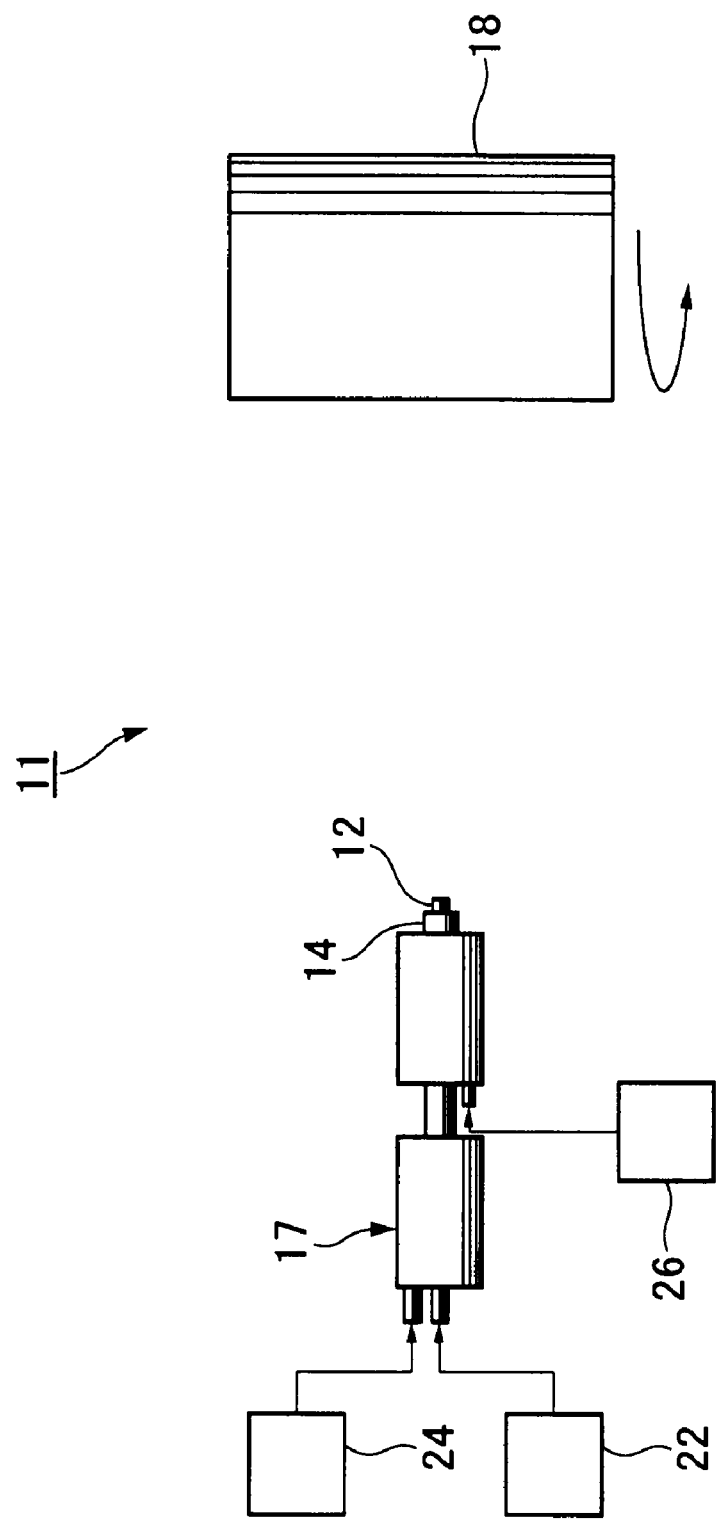
FIG. 6 is a structural view illustrating another example of an apparatus for producing a fiber to be used for the process of the present invention.
Figure 7:
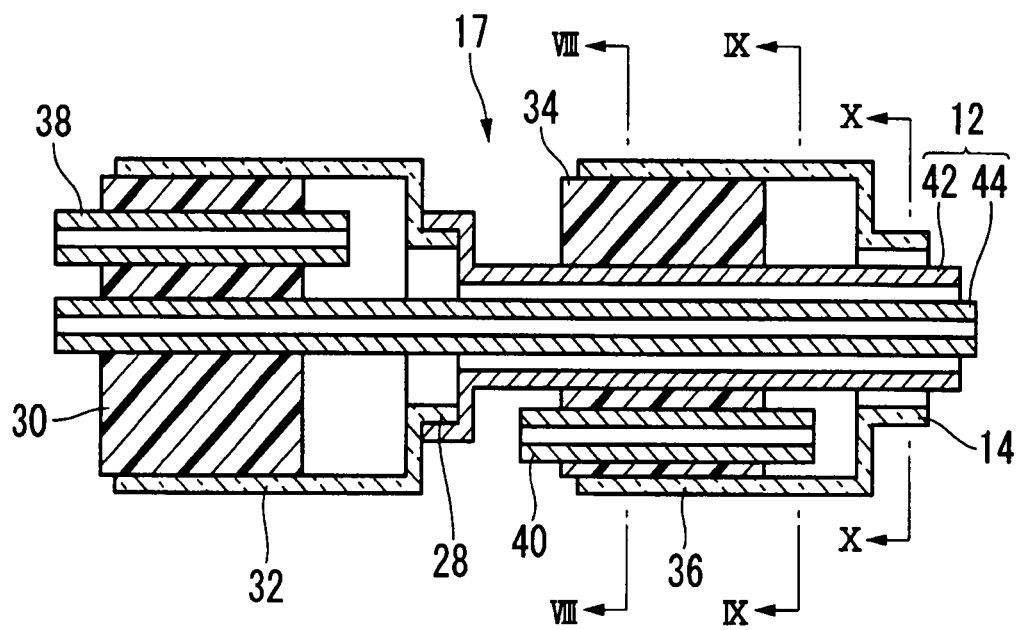
FIG. 7 is a cross-sectional view illustrating a spinning nozzle in the apparatus in FIG. 6.
Figure 8:
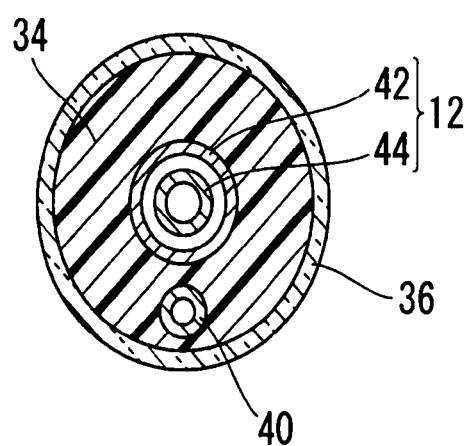
FIG. 8 is a cross-sectional view along VIII-VIII in the spinning nozzle in FIG. 7.
Figure 9:
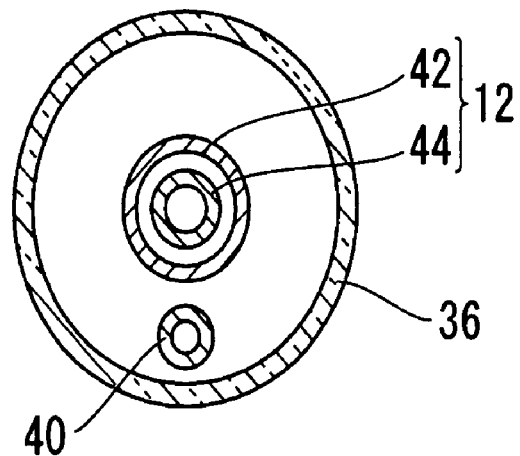
FIG. 9 is a cross-sectional view along IX-IX in the spinning nozzle in FIG. 7.
Figure 10:
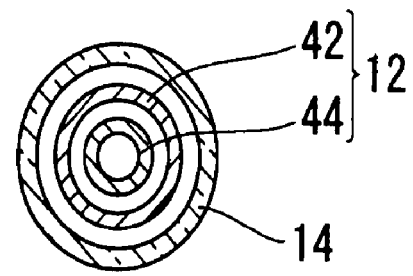
FIG. 10 is a cross-sectional view along X-X in the spinning nozzle in FIG. 7.

FIG. 6 is a structural view illustrating an example of an apparatus for producing a fiber to be used in the process (II-1). The fiber production apparatus 11 comprises a spinning nozzle 17 provided with a discharge nozzle 12 and a gas blowing nozzle 14; a rotatable drum 18 (collector) disposed to face the discharge nozzle 12; a pump 22 to supply a first spinning solution to the spinning nozzle 17; a pump to supply a second spinning solution to the spinning nozzle 17; and a pump 16 to supply a gas to the spinning nozzle 17.

As shown in FIGS. 7 to 10, the spinning nozzle 17 comprises a bottomed cylindrical first syringe 32 having a discharge outlet 28 formed at its forward end and having its base end sealed by a silicon cap 30; a bottomed cylindrical second syringe 36 disposed coaxially with the first syringe 32 and to let its base end face the forward end of the first syringe 32, having a gas blowing nozzle 14 formed at its forward end and having its base end sealed by a silicon cap 34; a tubular outside nozzle 42 having its base end connected to the discharge outlet 28 of the first syringe 32 and passing through the silicon cap 34 of the second syringe 36 and through a space in the second syringe 36 and in the gas blowing nozzle 14, and having its forward end projected beyond the forward end of the gas blowing nozzle 14; a tubular inside nozzle 44 passing through the silicon cap 30 of the first syringe 32 and through a space in the first syringe 32 and in the outside nozzle 42, and having its forward end projected beyond the forward end of the outside nozzle 42; a spinning solution supply tube 38 passing through the silicon cap 30 of the first syringe 32 to supply the second spinning solution to a space in the first syringe 32; and a gas supply tube 40 passing through the silicon cap 34 of the second syringe 36 to supply a gas to a space in the second syringe 36.

The outside nozzle 42 and the inside nozzle 44 are disposed concentrically so that a flow channel of the first spinning solution be formed in the inside nozzle 44 and a flow channel of the second spinning solution be formed in a space between the inside nozzle 44 and the outside nozzle 42, thereby to constitute a discharge nozzle 12.

The discharge nozzle 12 and the gas blowing nozzle 14 are disposed concentrically so that the outermost side be the gas blowing nozzle 14, and the discharge nozzle 12 be disposed inside of the gas blowing nozzle 14, and a gas flow channel be formed to let a gas flow in a space between the gas blowing nozzle 14 and the discharge nozzle 12. Further, the forward end of the discharge nozzle 12 located inside is projected beyond the forward end of the outermost gas blowing nozzle 14. By this disposition, when the gas is blown out from the gas blowing nozzle 14, a gas stream substantially parallel to the discharge direction of the two types of spinning solutions discharged from the discharge nozzle 12, will be formed.

The production of a fiber by means of the fiber production apparatus 11 is carried out as follows.

Firstly, the drum 18 is rotated. The pump 22 is operated to supply a first spinning solution from the base end of the inside nozzle 44 and to let the first spinning solution be discharged at a constant rate from the forward end of the inside nozzle 44. At the same time, the pump 24 is operated to supply a second spinning solution to a space in the first syringe 32 through the spinning solution supply tube 38 and to let the second spinning solution be discharged at a constant rate from the forward end of the outside nozzle 42, of which the base end is connected to the discharge outlet 28 at the forward end of the first syringe 32. At the same time, the pump 26 is operated to supply a pressurized gas to a space in the second syringe 36 through the gas supply tube 40 and to let the pressurized gas be blown out from the gas blowing nozzle 14 at the forward end of the second syringe 36 thereby to let a gas stream be formed which is substantially parallel to the discharge direction of the two types of spinning solutions discharged from the discharge nozzle 12.

When the frictional force between the two types of spinning solutions discharged from the discharge nozzle 12 and the gas in contact with the spinning solutions, exceeds the surface tension of the spinning solutions, the spinning solutions undergo a deformation into a conical shape so-called Taylor cone at the forward end of the discharge nozzle 12, and the forward end of the cone will be further stretched. The stretched two types of the spinning solutions are further stretched and slimmed by the gas stream formed by the gas blown out from the gas blowing nozzle 14. From the slimmed two types of spinning solutions, the solvent will be instantaneously evaporated by the gas stream to form a fiber having a core-in-sheath structure having different compositions between the center in cross-section of the fiber and the periphery of the fiber (the fiber having a core-in-sheath structure will hereinafter be referred to as a core-in-sheath fiber). The formed core-in-sheath fiber is transported by the gas stream and will adhere to the drum 18, whereby the fiber is less likely to scatter around the apparatus, and the deposition efficiency can be improved. The fiber will gradually accumulate on the rotating drum 18, whereby a non-woven fabric constituted by the continuous fiber, will be formed on the drum 18.

Further, by the gas stream substantially parallel to the discharge direction of the two types of spinning solutions discharged from the discharge nozzle 12, the core-in-sheath fiber is readily directed towards the drum 18, and the fiber is less likely to scatter around the apparatus, whereby the deposition efficiency can be further improved, and it is possible to lower the cost as a whole. Further, by the gas stream, the core-in-sheath fiber will be accumulated without irregularities on the drum 18, whereby a uniform non-woven fabric can readily be formed.

As the spinning solutions in the process (II-1), a spinning solution (b) containing a fluorinated ion exchange resin and a solvent, and a spinning solution (c) containing an electrically conductive material and a solvent, are used.

In a case where the first spinning solution (core portion) is the spinning solution (b), the second spinning solution (sheath portion) is the spinning solution (c). On the other hand, in a case where the first spinning solution (core portion) is the spinning solution (c), the second spinning solution (sheath portion) is the spinning solution (b).

The spinning solution (b) is a solution or a dispersion having a fluorinated ion exchange resin dissolved or dispersed in a solvent. The solvent may be the same one as used for the spinning solution (a) and is preferably a mixed solvent of water with an organic solvent having a hydroxy group. The organic solvent having a hydroxy group may the same one as used for the spinning solution (a).

The proportion of water is preferably at least 10 mass %, more preferably at least 20 mass %, in the mixed solvent (100 mass %). And, the proportion of water is preferably at most 99 mass %, more preferably at most 80 mass %. When the proportion of water is at least 10 mass %, the fiber can easily be formed. When the proportion of water is at most 99 mass %, the viscosity of the spinning solution can easily be adjusted.

The proportion of the fluorinated ion exchange resin is preferably at least 20 mass %, more preferably at least 25 mass %, in the spinning solution (b) (100 mass %). And, the proportion of the fluorinated ion exchange resin is preferably at most 40 mass %, more preferably at most 35 mass %. When the proportion of the fluorinated ion exchange resin is within such a range, the fiber can easily be formed.

The spinning solution (b) preferably further contains PAO, whereby the fiber can be formed constantly. PAO is preferably PEO. The molecular weight of PEO is preferably within the same range as the above-mentioned molecular weight of PEO.

In a case where the fluorinated ion exchange resin and PAO are contained as polymers, the proportion of PAO is preferably at least 0.01 mass %, more preferably at least 0.1 mass %, in the spinning solution (b) (100 mass %). And, the proportion of PAO is preferably at most 20 mass %, more preferably at most 10 mass %. When the proportion of PAO is within such a range, the fiber can be formed constantly.

The viscosity of the spinning solution (b) is preferably at least 100 mPa·s, more preferably at least 200 mPa·s. And, such a viscosity is preferably at most 5,000 mPa·s, more preferably at most 2,500 mPa·s. When the viscosity of the spinning solution (b) is within such a range, the fiber can be easily formed.

The spinning solution (c) is a solution or dispersion having an electrically conductive material dissolved or dispersed in a solvent. The spinning solution (c) preferably contains a polymer, since it is thereby possible to form the fiber constantly.

The polymer may be any polymer so long as it is capable of forming a fiber, and such a polymer may, for example, be a fluorinated ion exchange resin or PAO, and in a case where the fiber is used for a catalyst layer, a fluorinated ion exchange resin is preferred.

The electrically conductive material may be the same one as used for the spinning solution (a), and it is preferably a catalyst in a case where the fiber is used for a catalyst layer in a membrane/electrode assembly for a polymer electrolyte fuel cell.

The solvent may be the same one as used for the spinning solution (a), and in a case where a fluorinated ion exchange resin is contained as the polymer, and the electrically conductive material is a catalyst, the solvent is preferably a mixed solvent of water with an organic solvent having a hydroxy group. The organic solvent having a hydroxy group may be the same one as used for the spinning solution (a).

The proportion of water is preferably at least 10 mass %, more preferably at least 20 mass %, in the mixed solvent (100 mass %). And, the proportion of water is preferably at most 99 mass %, more preferably at most 80 mass %. When the proportion of water is at least 10 mass %, the fiber can easily be formed. When the proportion of water is at most 99 mass %, the viscosity of the spinning solution can easily be adjusted.

In a case where as the polymer, a fluorinated ion exchange resin is contained, and the electrically conductive material is a catalyst, the proportion of the total of the fluorinated ion exchange resin and the catalyst is preferably from 1 to 30 mass %, more preferably from 5 to 15 mass % in the spinning solution (c) (100 mass %) with a view to obtaining a proper viscosity level. Further, the mass ratio of the fluorinated ion exchange resin to the catalyst (polymer/catalyst) in the spinning solution (c) is preferably from 0.2 to 4.0. When the mass ratio is within such a range, the electrical conductivity and gas diffusion property of the catalyst layer will be good.

In a case where as the polymer, a fluorinated ion exchange resin is contained, the spinning solution (c) preferably further contains PAO, since it is thereby possible to form the fiber constantly. PAO is preferably PEO. The molecular weight of PEO is preferably within the same range as the above-mentioned molecular weight of PEO.

In a case where as the polymer, the fluorinated ion exchange resin and PAO are contained, the proportion of PAO is preferably at least 0.01 mass %, more preferably at least 0.1 mass %, in the spinning solution (c) (100 mass %). And, the proportion of PAO is preferably at most 20 mass %, more preferably at most 10 mass %. When the proportion of PAO is within such a range, it is possible to form the fiber constantly.

In a case where as the polymer, a fluorinated ion exchange resin is contained, the viscosity of the spinning solution (c) is preferably at least 100 mPa·s, more preferably at least 200 mPa·s. And, such a viscosity is preferably at most 5,000 mPa·s, more preferably at most 2,500 mPa·s. When the viscosity of the spinning solution (c) is within such a range, the fiber is easily formed.

The discharge amount of the spinning solution (b) is preferably within the same range as the above-mentioned discharge amount of the spinning solution (a).

The discharge amount of the spinning solution (c) is preferably within the same range as the above-mentioned discharge amount of the spinning solution (a).

The blowoff amount of the gas is preferably within the same range as the above-mentioned blowoff amount of the gas.

The inner diameter of the forward end of the inside nozzle 44 is preferably at least 0.05 mm, more preferably at least 0.1 mm. And, such an inner diameter is preferably at most 2 mm, more preferably at most 1 mm. When the inner diameter of the forward end of the inside nozzle 44 is at least 0.05 mm, the inside nozzle 44 is less likely to be clogged. When the inner diameter of the forward end of the inside nozzle 44 is at most 2 mm, a fine fiber can be formed.

The inner diameter of the forward end of the outside nozzle 42 is preferably larger by from 0.05 to 1.0 mm, more preferably by from 0.1 to 0.8 mm, than the outer diameter of the forward end of the inside nozzle 44. When the inner diameter of the forward end of the outside nozzle 42 is within such a range, the outside nozzle 42 is less likely to be clogged, and it is possible to form a fine fiber.

The inner diameter of the forward end of the gas blowing nozzle 14 is preferably larger by from 0.1 to 2.0 mm, more preferably by from 0.1 to 1.0 mm, than the outer diameter of the forward end of the discharge nozzle 12. When the inner diameter of the forward end of the gas blowing nozzle 14 is within such a range, it is possible to efficiently stretch by the air stream the two types of spinning solutions which are being spun by the dry spinning method.

The distance from the forward end of the discharge nozzle 12 to the drum 18 is preferably at least 3 cm, more preferably at least 5 cm. And, such a distance is preferably at most 30 cm, more preferably at most 20 cm. When such a distance is at least 3 cm, evaporation of the solvent can be carried out sufficiently. When such a distance is at most 30 cm, the fiber can easily be accumulated.

In the above-described process for producing a fiber of the present invention, gas stream stretching is combined with the dry spinning method, whereby as compared with other methods, the fiber can be produced by a simple apparatus, and an ultrafine fiber can be obtained, and thus, a fiber capable of forming a catalyst layer having a high gas diffusion property can be produced easily with low cost. Further, by the combined use of the gas stream stretching, such effects that the fiber is less likely to be scattered around the apparatus, and a uniform non-woven fabric can easily be formed, can be expected.

Further, the spinning nozzle to be used for the process for producing a fiber of the present invention is not limited to the one illustrated in the drawings. For example, it may be a spinning nozzle wherein a plurality of discharge nozzles are disposed between slit-form gas blowing nozzles in a line along the longitudinal direction of the slits; a spinning nozzle having n flow channels (where n is an integer of at least 2) and one discharge nozzle to discharge n types of spinning solutions joined in a multilayer stream at the terminal ends of the flow channels in the multilayer stream state; or a spinning nozzle having a discharge nozzle composed of multi-layer nozzles wherein n nozzles which are different in diameter from one another are disposed concentrically so that flow channels be formed in spaces between adjacent nozzles.

Fiber

The fiber obtainable by the process of the present invention contains a fluorinated ion exchange resin.

The form of the fiber may, for example, be a usual fiber formed by spinning one type of a spinning solution obtained by the process (I), or a composite fiber formed by spinning n-types of spinning solutions obtained by the process (II). The composite fiber is preferably a core-in-sheath fiber formed by spinning two types of spinning solutions obtained by the process (II-1).

The core-in-sheath fiber is preferably a core-in-sheath fiber wherein at least one of the core portion and the sheath portions contains a catalyst containing a metal.

As such a core-in-sheath fiber, the following core-in-sheath fibers may, for example, be mentioned.

($\alpha$) A core-in-sheath fiber formed by using a spinning solution (b) containing a fluorinated ion exchange resin for the core portion and using a spinning solution (c) containing a catalyst for the sheath portion (hereinafter referred to as a core-in-sheath fiber ($\alpha$)).

($\beta$) A core-in-sheath fiber formed by using a spinning solution (c) containing a catalyst for the core portion and using a spinning solution (b) containing a fluorinated ion exchange resin for the sheath portion (hereinafter referred to as a core-in-sheath fiber ($\beta$)).

Figure 11:
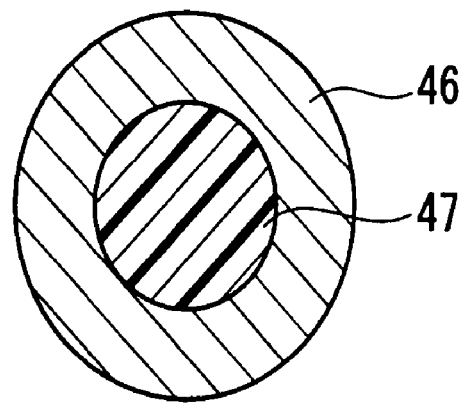
FIG. 11 is a cross-sectional view illustrating a core-in-sheath fiber (α).

As shown in FIG. 11, in the core-in-sheath fiber ($\alpha$), the sheath portion is a portion 46 where the catalyst is localized, and the core portion is a portion 47 composed mainly of the fluorinated ion exchange resin. The core-in-sheath fiber ($\alpha$) is excellent in proton conductivity in the length direction and also excellent in a reactivity with a raw material gas to be supplied from outside.

Figure 12:
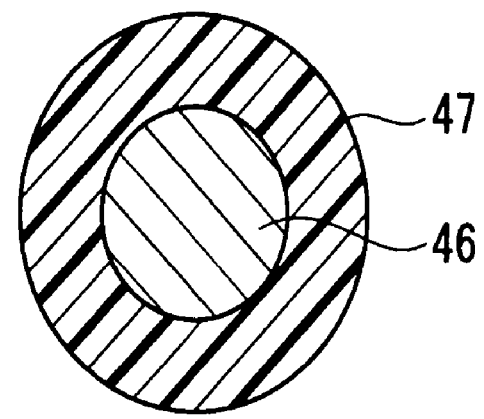
FIG. 12 is a cross-sectional view illustrating a core-in-sheath fiber (β).

As shown in FIG. 12, in the core-in-sheath fiber ($\beta$), the core portion is a portion 46 where the catalyst is localized, and the sheath portion is a portion 47 composed mainly of the fluorinated ion exchange resin. The core-in-sheath fiber ($\beta$) is excellent in electron conductivity in the length direction and facilitates supply of protons to the reaction site (circumference side).

By permitting a plurality of core-in-sheath fibers to coexist in a catalyst layer, for example, by forming a non-woven fabric so that the core-in-sheath fiber ($\beta$) is localized in the polymer electrolyte membrane side, and the core-in-sheath fiber ($\alpha$) is localized on the gas diffusion layer side, it is possible to facilitate supply of protons from the polymer electrolyte membrane and also to increase the reactivity of the catalyst layer. At the time of forming such a non-woven fabric, it is preferred to press or compress the non-woven fabric to form more mass transfer interfaces between fibers, with a view to improving the performance.

The fiber diameter of the fiber is preferably from 0.1 to 30 µm. When the fiber diameter is at least 0.1 µm, spinning can be carried out under a stabilized condition without breakage, etc. of the fiber by the dry spinning method. When the fiber diameter is at most 30 µm, the gas diffusion property of the catalyst layer made of such a non-woven fabric can be made sufficiently high.

The fiber diameter of the fiber is obtained by observing the non-woven fabric by an electron microscope and measuring and averaging the widths of at least 100 fibers randomly selected. Otherwise, it is obtained by observing a cross-section of the non-woven fabric by an electron microscope and measuring and averaging the cross-sectional diameters of at least 100 fibers thus observed.

The aspect ratio of the fiber is preferably at least 1,000. When the aspect ratio is at least 1,000, such a fiber may be deemed to be a substantially continuous fiber, and when it is formed into a non-woven fabric, contact portions of fibers to one another will be sufficiently present, whereby the form-maintaining property will be excellent and a bulk density of the non-woven fabric can be lowered. Therefore, when the aspect ratio of the fiber is at least 1,000, it is possible to form a catalyst layer having a high gas diffusion property. If the aspect ratio is less than 1,000, the form-maintaining property tends to be weak when such a fiber is formed into a non-woven fabric, and it tends to be difficult to maintain the form of the catalyst layer.

The aspect ratio of the fiber is obtained by observing the fiber constituting a non-woven fabric by an electron microscope, an optical microscope or the like and measuring the fiber diameter and length of the fiber.

Membrane/Electrode Assembly

A membrane/electrode assembly for a polymer electrolyte fuel cell (hereinafter referred to as a membrane/electrode assembly) in the present invention is a membrane/electrode assembly comprising an anode having a catalyst layer, a cathode having a catalyst layer and a polymer electrolyte membrane disposed between the anode and the cathode in a state in contact with the catalyst layers, wherein at least one of the catalyst layer of the anode and the catalyst layer of the cathode contains the fiber containing a catalyst (hereinafter referred to as an electrically conductive fiber) obtained by the process of the present invention.

In the membrane/electrode assembly in the present invention, it is preferred that the two catalyst layers are catalyst layers containing the above electrically conductive fiber.

In a case where one catalyst layer contains the above electrically conductive fiber, and the other catalyst layer does not contains the electrically conductive fiber, the catalyst layer containing the electrically conductive fiber is preferably the catalyst layer of the cathode.

The other catalyst layer not containing the electrically conductive fiber may be a conventional catalyst layer. Such a conventional catalyst layer may, for example, be a catalyst layer formed by e.g. a coating method from a dispersion containing a fluorinated ion exchange resin and a catalyst.

Now, a case wherein the two catalyst layers are catalyst layers containing the electrically conductive fiber will be described.

Figure 13:
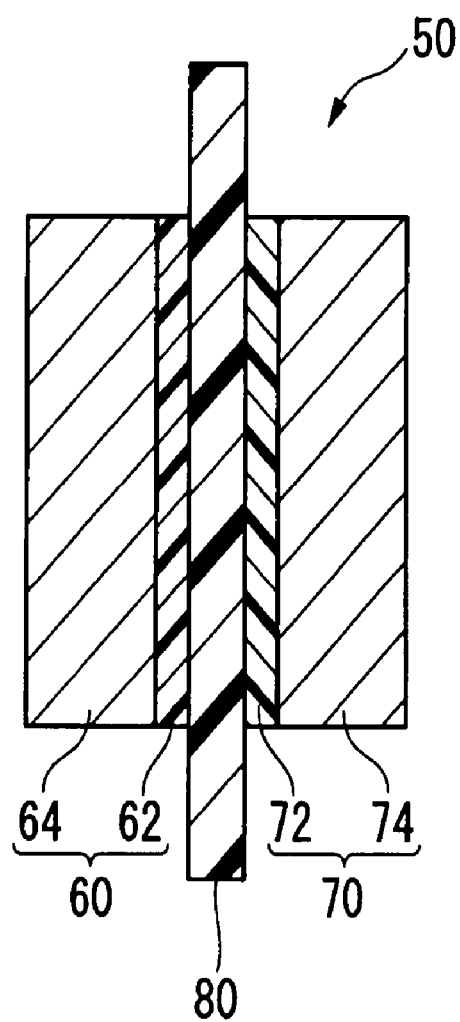
FIG. 13 is a cross-sectional view illustrating an example of the membrane/electrode assembly.

FIG. 13 is a cross-sectional view illustrating an example of a membrane/electrode assembly. A membrane/electrode assembly 50 comprises an anode 60 having a catalyst layer 62 and a gas diffusion layer 64, a cathode 70 having a catalyst layer 72 and a gas diffusion layer 74, and a polymer electrolyte membrane 80 disposed between the anode 60 and the cathode 70 in a state in contact with each catalyst layer.

Catalyst Layer

Each of the catalyst layer 62 and the catalyst layer 72 (hereinafter generally referred to as a catalyst layer) is a catalyst layer containing a non-woven fabric made of the electrically conductive fiber obtained by the process of the present invention. Here, such an electrically conductive fiber contains a fluorinated ion exchange resin as a polymer and a catalyst as an electrically conductive material.

Further, the non-woven fabric constituting the catalyst layer may contain a fiber not containing a fluorinated ion exchange resin, within a range not to impair the power generation performance.

Further, the catalyst layer may contain a component other than the non-woven fabric, within a range not to impair the effects of the present invention.

The bulk density of the catalyst layer is preferably from 0.1 to 1.1 g/cc. When the bulk density of the catalyst layer is within such a range, the gas diffusion property will be sufficiently high, and the form-maintaining property of the catalyst layer will be excellent. Accordingly, a polymer electrolyte fuel cell provided with such a catalyst layer will have a high output voltage even when operated at a high current density.

The bulk density of the catalyst layer is calculated from the mass per unit area of the catalyst layer and the thickness of the catalyst layer. The mass per unit area of the catalyst layer is obtained from the area of the non-woven fabric and the increased mass at the time of forming a non-woven fabric to constitute a catalyst layer, on a substrate with a known mass (such as a gas diffusion layer, a polymer electrolyte membrane 80 or the like). The thickness of the catalyst layer is measured by observing the cross-section by e.g. an electron microscope.

Gas Diffusion Layer

The material to constitute the gas diffusion layer 64 and the gas diffusion layer 74 (hereinafter generally referred to as a gas diffusion layer) may, for example, be a porous carbon sheet such as carbon paper, a carbon cloth or a carbon felt. It is preferred that the gas diffusion layer is treated for water repellency e.g. by polytetrafluoroethylene (hereinafter referred to as PTFE).

Polymer Electrolyte Membrane

The polymer electrolyte membrane 80 is a membrane containing an ion exchange resin.

The ion exchange resin may, for example, be a fluorinated ion exchange resin or non-fluorinated ion exchange resin. From the viewpoint of durability, a fluorinated ion exchange resin is preferred, and the above-mentioned polymer (H) or (Q) is more preferred.

A non-fluorinated ion exchange resin may, for example, be a polymer having sulfonic acid groups and no fluorine atoms. Such a polymer may be a polymer having an organic ring and having a structure having a sulfonic acid group introduced to the aromatic ring, and has an ion exchange capacity of from 0.8 to 3.0 meq/g dry resin. Specifically, it may, for example, be a sulfonated polyarylene, a sulfonated polybenzooxazole, a sulfonated polybenzothiazole, a sulfonated polybenzoimidazole, a sulfonated polysulfone, a sulfonated polyethersulfone, a sulfonated polyether ether sulfone, a sulfonated polyphenylene sulfone, a sulfonated polyphenylene oxide, a sulfonated polyphenylene sulfoxide, a sulfonated polyphenylene sulfide, a sulfonated polyphenylene sulfide sulfone, a sulfonated polyether ketone, a sulfonated polyether ether ketone, a sulfonated polyether ketone ketone, or a sulfonated polyimide.

The polymer electrolyte membrane 80 may contain a reinforcing material. The reinforcing material may, for example, be a porous body, a fiber, a woven fabric or a non-woven fabric. The material for the reinforcing material may, for example, be PTFE, a tetrafluoroethylene/hexafluoropropylene copolymer, a tetrafluoroethylene/perfluoro(alkyl vinyl ether) copolymer, a polyethylene, a polypropylene or a polyphenylene sulfide.

Carbon Layer

Figure 14:
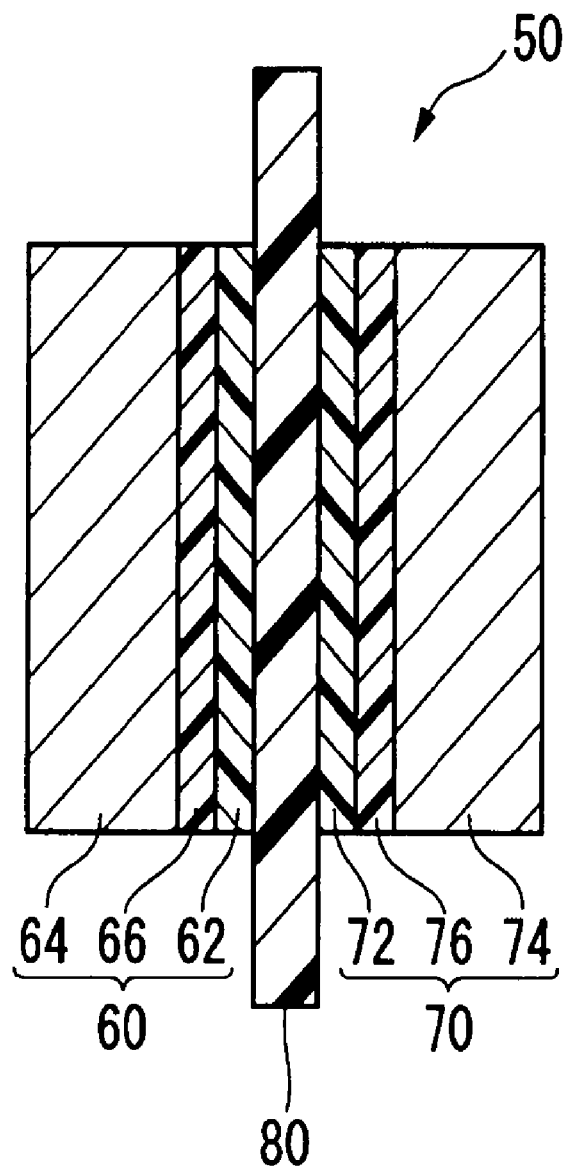
FIG. 14 is a cross-sectional view illustrating another example of the membrane/electrode assembly.

As shown in FIG. 14, the membrane/electrode assembly 50 may have a carbon layer 66 and a carbon layer 76 (hereinafter generally referred to as a carbon layer) between a catalyst layer and a gas diffusion layer. By disposing such a carbon layer, the gas diffusion property of the surface of the catalyst layer will be improved, and the power generation characteristics of the polymer electrolyte fuel cell will substantially be improved.

The carbon layer is a layer containing carbon, and, if necessary, a binder. The carbon may be carbon particles, carbon nanofibers, etc. The carbon particles are preferably carbon black. The carbon nanofibers are preferably carbon nanofibers having a fiber diameter of from 1 to 1,000 nm and a fiber length of at most 1,000 μm. The binder is preferably a water repellent fluoropolymer, particularly preferably PTFE.

Method for Producing Membrane/Electrode Assembly

The membrane/electrode assembly 50 may be produced, for example, by the following method (x-1) or (x-2).

(x-1) A method wherein a catalyst layer is formed on a polymer electrolyte membrane 80 to form a membrane/catalyst layer assembly, and the membrane/catalyst layer assembly is sandwiched by gas diffusion layers.

(x-2) A method wherein a catalyst layer is formed on a sheet for a gas diffusion layer to form an electrode (anode 60, cathode 70), and a polymer electrolyte membrane 80 is sandwiched by such electrodes.

Further, in a case where the membrane/electrode assembly 50 has carbon layers, such a membrane/electrode assembly 50 may be produced, for example, by the following method (x-3).

(x-3) A method wherein a dispersion containing carbon and a non-ionic fluoropolymer, is applied on a gas diffusion layer, followed by drying to form a carbon layer, and the membrane/catalyst layer assembly in the above method (x-1) is sandwiched by gas diffusion layers having such a carbon layer.

The polymer electrolyte membrane 80 and the gas diffusion layer to be used in the methods (x-1) to (x-3) may be in the form of a sheet or in the form of a web (continuum).

The method for forming the catalyst layer may, for example, be the following method (y-1) or (y-2), and the method (y-2) is preferred.

(y-1) A method wherein at the time of producing an electrically conductive fiber by the process of the present invention, the electrically conductive fiber is accumulated on a release substrate to form a non-woven fabric, and such a non-woven fabric is laminated on a polymer electrolyte membrane 80 or a gas diffusion layer, and thereafter, the release substrate is removed to form a catalyst layer.

(y-2) A method wherein at the time of producing an electrically conductive fiber by the process of the present invention, the electrically conductive fiber is accumulated on the polymer electrolyte membrane 80 or a gas diffusion layer to form a non-woven fabric thereby to form a catalyst layer.

The release substrate, the polymer electrolyte membrane 80 or the gas diffusion layer may be disposed on the collector (drum 18) at the time of producing an electrically conductive fiber by the process of the present invention.

The above-described membrane/electrode assembly has a catalyst layer having a high gas diffusion property. Thus, the polymer electrolyte fuel cell provided with such a membrane/electrode assembly is capable of exhibiting excellent power generation performance even when it is operated at a high current density.

Polymer Electrolyte Fuel Cell

The membrane/electrode assembly of the present invention is used for a polymer electrolyte fuel cell. The polymer electrolyte fuel cell is produced, for example, by sandwiching the membrane/electrode assembly between two separators to form a cell, and stacking a plurality of such cells.

The separator may, for example, be an electrically conductive carbon plate having grooves formed to constitute channels for a fuel gas or an oxidizing gas containing oxygen (such as air or oxygen).

As types of the polymer electrolyte fuel cell, a hydrogen/oxygen type fuel cell, a direct methanol type fuel cell (DMFC), etc., may be mentioned.

EXAMPLES

Now, the present invention will be described in further detail with reference to Examples, but it should be understood that the present invention is by no means restricted by these Examples.

Examples 1 to 4, 6 and 7 are Working Examples of the present invention, and Example 5 is a Comparative Example.

Viscosity

The viscosity of a solution was measured by using an E-model viscometer (manufactured by TOKI Sangyo K.K.) at a shear rate of 1 sec$^{-1}$.

Average Fiber Diameter

In each of Examples 1 to 5, the non-woven fabric was embedded by an epoxy resin and cross-sectionally cut by means of a microtome. Then, the cross-section was observed by an electron microscope, and the diameters of the fibers observed were measured. The fibers to be measured were 140 fibers.

Fiber Length

An electron microscopic photograph of the non-woven fabric was continuously photographed within a range of 2 mm or 3 mm, and it was confirmed that within such a range, there was no fiber, of which both ends were confirmed.

Deposition Efficiency of Catalyst

The deposition efficiency of the catalyst was measured as follows.

The mass of a spinning solution discharged from a discharge nozzle to form a catalyst layer, was measured, and from the mass % of all non-volatile components contained in the spinning solution, the mass W1 of non-volatile components discharged from the discharge nozzle was calculated. Further, the total mass W2 of the formed catalyst layer was measured. And, the ratio of W2 to W1 (W2/W1×100) was taken as the deposition efficiency. However, prior to the measurement of W2, drying treatment at 80° C. for at least 30 minutes was carried out in order to remove the solvent component contained in the catalyst layer.

Gas Diffusion Property

Figure 15:
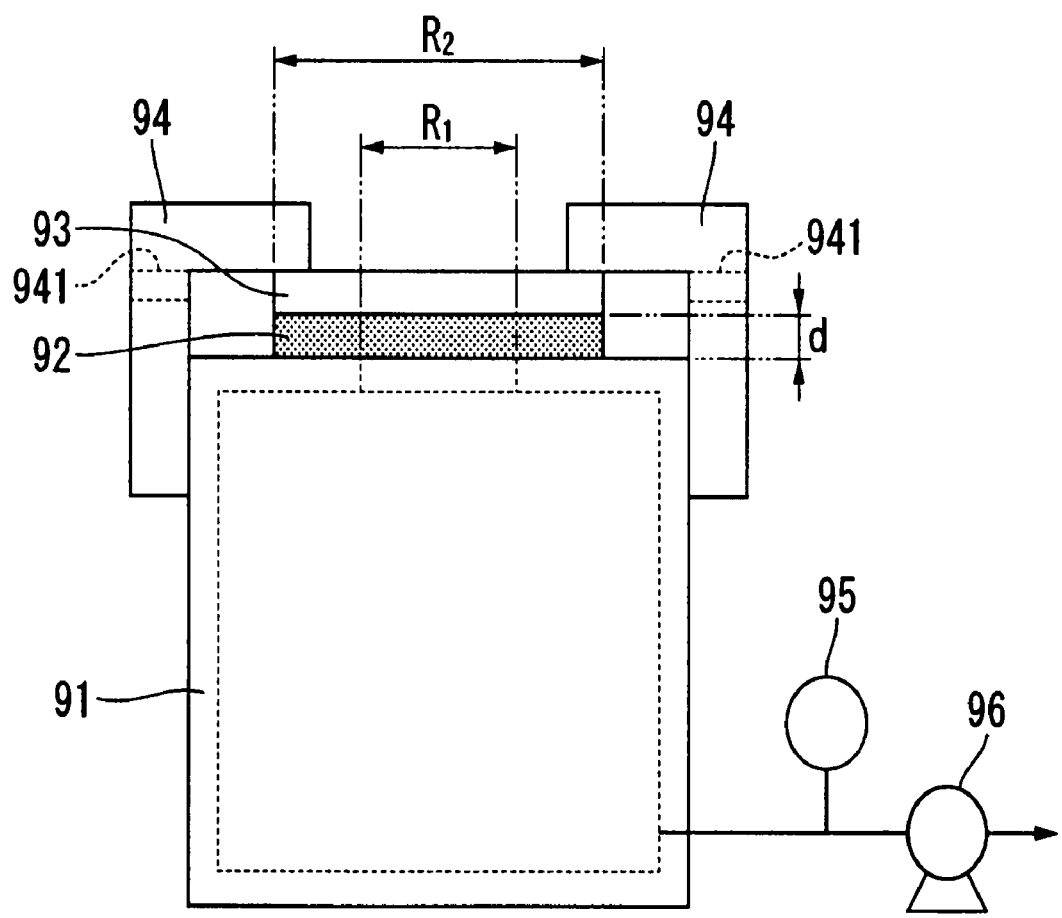
FIG. 15 is a view illustrating an apparatus for evaluation of the gas diffusion property.

The gas diffusion property was measured by using an apparatus for evaluating the gas diffusion property illustrated in FIG. 15.

Firstly, a disc sample 92 having a radius $R_2$ was placed on a top surface of a cylindrical body 91 having an internal capacity of 96.0 cm$^3$ and having a perforation with a radius $R_1$ formed on its top surface, a disc cover 93 having the same radius as the sample 92 was placed on the sample, and the sample 92 and the cover 93 were fixed on the top surface of the cylindrical body 91 by a cap-form jig 94 having an air vent 941. While the internal pressure of the cylindrical body 91 was measured by a pressure meter 95, the internal air of the cylindrical body 91 was withdrawn by a pump 96 connected to the cylindrical body 91, and when the interior of the cylindrical body 91 became at most 0.1 kPa, the pump 96 was stopped, and the rise of the internal pressure of the cylindrical body was recorded. From the internal capacity (96.0 cm$^3$) of the cylindrical body 91, the permeation rate of the permeated air was calculated and converted to an in-plane permeation coefficient. Here, the temperature for the measurement was within a range of from 23 to 28° C.

*Pm*=(permeated volume of air per unit time)/(sample permeation cross-sectional area *S*)×(permeation distance)/(pressure difference)

where Pm is the in-plane permeation coefficient of air; the sample permeation cross-sectional area S is $2\pi R_2 \cdot d$, where d is the thickness of the sample; and the permeation distance is $R_2 - R_1$.

Here, the permeated volume of air per unit time is the volume of air converted to a standard state, which is calculated from the pressure rise by inflow of permeated air, based on the equation of state of the gas.

Electrical Conductivity

By using a common four-terminal probe method, the in-plane AC resistivity of a non-woven fabric having an electrically conductive fiber accumulated, was obtained, and the in-plane electrical conductivity of the catalyst layer was calculated. Here, the temperature for the measurement was 110° C., and the measurement was carried out under heating in a dry air so that the humidity became 0% RH, so that the measurement was carried out under such a condition that the fluorinated ion exchange resin contained in the catalyst layer showed no proton electrical conductivity, whereby only the electron conductivity developed from the characteristic of the electrically conductive material (catalyst) constituting the catalyst layer, was evaluated.

Hot Water Resistance

A catalyst layer made of a non-woven fabric having an electrically conductive fiber accumulated was, as it was present on a substrate such as a polymer electrolyte membrane on which it was formed, cut out in a size of 2 cm×2 cm and immersed in hot water of 90° C. for two weeks, whereupon the appearance was visually observed to see whether there was peeling from the substrate or breakage of the catalyst layer itself, disintegration of the form, etc., and the presence or absence of the mass change was measured.

Power Generation Performance

A membrane/electrode assembly was inserted in a fuel cell evaluation cell having common serpentine flow channels and having an area of 25 cm$^2$ and pressed from both sides with a pressure of 0.5 MPa, and by supplying hydrogen gas to an anode at a rate of 0.5 L/min and air to a cathode so that oxygen gas would be 1.2 L/min, the output voltage was measured at a cell temperature of 80° C. at a power density of 1.2 A/cm$^2$. The gas humidifying temperature was 64° C.

Example 1

Preparation of Polymer Electrolyte Membrane:

On an ethylene/tetrafluoroethylene copolymer (hereinafter referred to as ETFE) film (manufactured by Asahi Glass Company, Limited, thickness: 100 μm), a water/ethanol solution (solvent composition: water/ethanol=4/6 by mass ratio, solid content: 27 mass %) of a polymer (H11) (manufactured by Asahi Glass Company, Limited, Flemion R, ion exchange capacity: 1.1 meq/g dry resin) having repeating units based on TFE and repeating units represented by the following formula (11), was cast and dried at 80° C. for 30 minutes in a commercially available circulation type dryer, to obtain a polymer electrolyte membrane having a thickness of 10 μm. Further, the same operation was repeated twice to obtain polymer electrolyte membrane (MA1) having a thickness of 30 μm provided with the ETFE film. Further, it was heated at 160° C. for 30 minutes in the commercially available circulation type dryer to carry out annealing treatment.

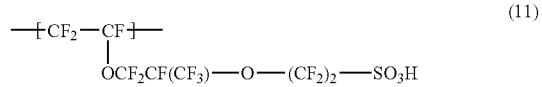

(11)

Preparation of Spinning Solution (B1):

To a water/ethanol solution of the polymer (H11) (solvent composition: water/ethanol=4/6 by mass ratio, solid content: 27 mass %), PEO (mass average molecular weight: 1000,000) was added so that it became 0.3 mass %, followed by mixing at room temperature for one hour by means of a magnetic stirrer to obtain a spinning solution (b1) having a viscosity of 2,000 mPa·s.

Preparation of Spinning Solution (C1):

Into a cylindrical polyethylene bottle (internal capacity: 100 cc) which can be sealed, 10 g of platinum-supported carbon (manufactured by Tanaka Kikinzoku Kogyo K.K., TEC10E50E, platinum-supported ratio: 50 mass %) and 26.9 g of distilled water were put and stirred, and further, 22.7 g of ethanol was added. Then, 28.6 g of a water/ethanol solution of the polymer (H11) (solvent composition: water/ethanol=4/6 by mass ratio, solid content: 27 mass %) was added. Further, $ZrO_2$ particles having a diameter of 5 mm were put so that they would occupy about 40 cc, and then, the polyethylene bottle was rotated for 24 hours on a commercially available ball mill rotating table to obtain a spinning solution (c1) having a viscosity of 10,000 mPa·s.

Formation of Catalyst Layer (C1):

The production apparatus 11 as illustrated in FIG. 6 and the spinning nozzle 17 as illustrated in FIGS. 7 to 10 were prepared. As the inside nozzle 44, an injection needle having an inner diameter of 0.25 mm and an outer diameter of 0.5 mm was used. As the outside nozzle 42, an injection needle having an inner diameter of 0.8 mm and an outer diameter of 0.2 mm was used. The gas blowing nozzle 14 had an inner diameter of 2.0 mm and an outer diameter of 4.0 mm. The shortest distance from the forward end of the discharge nozzle 12 to the drum 18 was 10 cm.

On the drum 18, the polymer electrolyte membrane (MA1) was put around, and the drum 18 was rotated. The pump 22, the pump 24 and the pump 26 were operated to have the spinning solution (c1) discharged from the inside nozzle 44 at a rate of 1 mL/hr, to have the spinning solution (b1) discharged from the outside nozzle 42 at a rate of 1 mL/hr and to have air blown out from the gas blowing nozzle 14 at a rate of 3.5 L/min, to form a core-in-sheath fiber (β) as illustrated in FIG. 12. Such a fiber was accumulated on the polymer electrolyte membrane (MA1) on the rotating drum 18 to form a non-woven fabric thereby to form a catalyst layer (C1) on the cathode side, whereby a membrane/catalyst layer assembly (MC1) was obtained.

The average fiber diameter of the fiber constituting the non-woven fabric and the deposition efficiency of the catalyst are shown in Table 1. No fiber having a fiber length of at most 3 mm was observed. The bulk density of the catalyst layer (C1) was 0.9 g/cc, and the amount of platinum per unit area was 0.30 mg/cm$^2$.

Further, with respect to the membrane/catalyst layer assembly (MC1), the gas diffusion property, electrical conductivity and water resistance were evaluated. The results are shown in Table 2.

Preparation of Gas Diffusion Layer (GDL1):

A high diffusion carbon paper (sold by SGL Carbon Japan Co., Ltd., GDL25BC) coated with a microporous layer was prepared and used as a gas diffusion layer (GDL1).

Preparation of Anode (AN1):

The spinning solution (c1) was diluted with a water/ethanol mixed solvent (1/1 by weight ratio) so that the solid content would 12 mass %, followed by stirring for 24 hours by a ball mill in the same manner as in the preparation of the spinning solution (c1), to obtain a coating fluid for forming a catalyst layer.

On the microporous layer of the gas diffusion layer (GDL1), the coating fluid for forming a catalyst layer was cast by a die coating method, followed by drying at 80° C. for 30 minutes to form catalyst layer (A1) thereby to obtain an anode (AN1). The bulk density of the catalyst layer (A1) was 1.2 g/cc, and the amount of platinum per unit area was 0.05 mg/cm$^2$.

Preparation of Gas Diffusion Layer (GDL2):

A carbon paper (sold by SGL Carbon Japan, Co., Ltd., GDL25BA) was prepared and used as a gas diffusion layer (GDL2).

Preparation of Membrane/Electrode Assembly (MEA1):

From the membrane/catalyst layer assembly (MC1), the ETFE film was peeled, and then the catalyst layer (C1) of the membrane/catalyst layer assembly (MC1) and the gas diffusion layer (GDL2) were bonded, and the polymer electrolyte membrane (MA1) of the membrane/catalyst layer assembly (MC1) and the catalyst layer (A1) of the anode (AN1) were bonded, to obtain a membrane/electrode assembly (MEA1).

The power generation performance of the membrane/electrode assembly (MEA1) was evaluated. The results are shown in Table 2.

Example 2

Formation of Catalyst Layer (C2):

In the same manner as in Example 1 except that the discharge amount of the spinning solution (b1) from the outside nozzle 42 was changed to 3 mL/hr, a core-in-sheath fiber (β) as illustrated in FIG. 12 was formed, and such a fiber was accumulated on the polymer electrolyte membrane (MA1) to form a non-woven fabric, thereby to form a catalyst layer (C2) on the cathode side, whereby a membrane/catalyst layer assembly (MC2) was obtained.

The average fiber diameter of the fiber constituting the non-woven fabric and the deposition efficiency of the catalyst are shown in Table 1. No fiber having a fiber length of at most 3 mm was observed. The bulk density of the catalyst layer (C2) was 0.8 g/cc, and the amount of platinum per unit area was 0.30 mg/cm$^2$.

Further, with respect to the membrane/catalyst layer assembly (MC2), the gas diffusion property, electrical conductivity and water resistance were evaluated. The results are shown in Table 2.

Preparation of Membrane/Electrode Assembly (MEA2):

A membrane/electrode assembly (MEA2) was obtained in the same manner as in Example 1 except that the membrane/catalyst layer assembly (MC2) was used instead of the membrane/catalyst layer assembly (MC1).

The power generation performance of the membrane/electrode assembly (MEA2) was evaluated. The results are shown in Table 2.

Example 3

Formation of Catalyst Layer (C3):

In the same manner as in Example 1 except that the discharge amount of the spinning solution (c1) from the inside nozzle 42 was changed to 2 mL/hr, a core-in-sheath fiber (β) as illustrated in FIG. 12 was formed, and such a fiber was accumulated on the polymer electrolyte membrane (MA1) to form a non-woven fabric thereby to form a catalyst layer (C3) on a cathode side, whereby a membrane/catalyst layer assembly (MC3) was obtained.

The average fiber diameter of the fiber constituting the non-woven fabric and the deposition efficiency of the catalyst are shown in Table 1. No fiber having a fiber length of at most 3 mm was observed. The bulk density of the catalyst layer (C3) was 0.8 g/cc, and the amount of platinum per unit area was 0.34 mg/cm$^2$.

Further, with respect to the membrane/catalyst layer assembly (MC3), the gas diffusion property, electrical conductivity and water resistance were evaluated. The results are shown in Table 2.

Preparation of Membrane/Electrode Assembly (MEA3):

A membrane/electrode assembly (MEA3) was obtained in the same manner as in Example 1 except that the membrane/catalyst layer assembly (MC3) was used instead of the membrane/catalyst layer assembly (MC1).

The power generation performance of the membrane/electrode assembly (MEA3) was evaluated. The results are shown in Table 2.

Example 4

Formation of Catalyst Layer (C4):

In the same manner as in Example 1 except that the spinning solution (b1) was discharged from the inside nozzle 44, and the spinning solution (c1) was discharged from the outside nozzle 42, a core-in-sheath fiber (α) as illustrated in FIG. 11 was formed, and such a fiber was accumulated on the polymer electrolyte membrane (MA1) to form a non-woven fabric thereby to form a catalyst layer (C4) on a cathode side, whereby a membrane/catalyst layer assembly (MC4) was obtained.

The average fiber diameter of the fiber constituting the non-woven fabric and the deposition efficiency of the catalyst are shown in Table 1. No fiber having a fiber length of at most 3 mm was observed. The bulk density of the catalyst layer (C4) was 0.8 g/cc, and the amount of platinum per unit area was 0.33 mg/cm$^2$.

hours by a ball mill in the same manner as in the preparation of the spinning solution (c1), to obtain a coating fluid for forming a catalyst layer.

On an ETFE film (manufactured by Asahi Glass Company, Limited, thickness: 100 μm), the coating fluid for forming a catalyst layer was cast by a die coating method, followed by drying at 80° C. for 30 minutes to form a catalyst layer (C6). The amount of platinum per unit area of the catalyst layer (C5) was 0.4 mg/cm$^2$.

The catalyst layer (C6) and the polymer electrolyte membrane (MA1) in Example 1 were put together and laminated under pressing conditions of a temperature of 130° C. and a pressure of 3 MPa to obtain a membrane/catalyst layer assembly (MC6). The bulk density of the catalyst layer (C6) was 1.2 g/cc.

Further, with respect to the membrane/catalyst layer assembly (MC6), the gas diffusion property, electrical conductivity and water resistance were evaluated. The results are shown in Table 2.

From the membrane/catalyst layer assembly (MC6), the ETFE film was peeled, and then, the catalyst layer (C6) of the membrane/catalyst layer assembly (MC6) and the microporous layer of the gas diffusion layer (GDL1) were bonded, and the polymer electrolyte membrane (MA1) of the membrane/catalyst layer assembly (MC6) and the catalyst layer (A1) of the anode (AN1) in Example 1 were bonded, to obtain a membrane/electrode assembly (MEA6).

The power generation performance of the membrane/electrode assembly (MEA6) was evaluated, but no power generation was possible at a current density of 1.2 A/cm$^2$.

TABLE 1

| | | Catalyst layer on cathode side | | | Catalyst layer on anode side |
|---|---|---|---|---|---|
| | Forming method | Electrically conductive fiber | Average fiber diameter (μm) | Deposition efficiency (%) | Forming method |
| Ex. 1 | Dry spinning method + gas stream stretching | Core-in-sheath fiber (β) | 2.4 | 98 | Coating method |
| Ex. 2 | Dry spinning method + gas stream stretching | Core-in-sheath fiber (β) | 6.0 | 90 | Coating method |
| Ex. 3 | Dry spinning method + gas stream stretching | Core-in-sheath fiber (β) | 5.0 | 90 | Coating method |
| Ex. 4 | Dry spinning method + gas stream stretching | Core-in-sheath fiber (α) | 3.0 | 90 | Coating method |
| Ex. 5 | Coating method | — | — | — | Coating method |

Further, with respect to the membrane/catalyst layer assembly (MC4), the gas diffusion property, electrical conductivity and water resistance was evaluated. The results are shown in Table 2.

Preparation of Membrane/Electrode Assembly (MEA4)

A membrane/electrode assembly (MEA4) was obtained in the same manner as in Example 1 except that the membrane/catalyst layer assembly (MC4) was used instead of the membrane/catalyst layer assembly (MC1).

The power generation performance of the membrane/electrode assembly (MEA4) was evaluated. The results are shown in Table 2.

Example 5

The spinning solution (c1) in Example 1 was diluted with a water/ethanol mixed solvent (1/1 by mass ratio) so that the solid content would be 12 mass %, followed by stirring for 24

TABLE 2

| | Gas diffusion In-plane permeation coefficient (cm$^3$ · cm/cm$^2$/sec/Pa) | Electrical conductivity (S/cm) | Water resistance Form-maintaining property by immersion in hot water at 90° C. for one week | Power generation performance Output voltage at current density of 1.2 A/cm$^2$ (mV) |
|---|---|---|---|---|
| Ex. 1 | 1.7 × 10$^5$ | 0.04 | ○ | 580 |
| Ex. 2 | 2.0 × 10$^5$ | 0.02 | ○ | 550 |
| Ex. 3 | 3.1 × 10$^5$ | 0.2 | ○ | 585 |
| Ex. 4 | 1.2 × 10$^5$ | 0.8 | ○ | 590 |
| Ex. 5 | 0.025 × 10$^5$ or less | 1.3 | ○ | — |

Example 6

Formation of Non-Woven Fabric (F1):

The production apparatus 10 as illustrated in FIG. 1 and the spinning nozzle 16 as illustrated in FIGS. 2 to 5 were prepared. As the discharge nozzle 12, an injection needle having an inner diameter of 0.25 mm and an outer diameter of 0.5 mm was used. The gas blowing nozzle 14 had an inner diameter of 2.0 mm and an outer diameter of 4.0 mm. The shortest distance from the forward end of the discharge nozzle 12 to the drum 18 was 10 cm.

On the drum 18, the polymer electrolyte membrane (MA1) was put around, and the drum 18 was rotated. The pump 22 and the pump 26 were operated to have the spinning solution (b1) discharged from the injection nozzle 12 at a rate of 9 mL/hr and to have air blown out from the gas blowing nozzle 14 at a rate of 3.5 L/min, to form a fiber. Such a fiber was accumulated on the polymer electrolyte membrane (MA1) on the rotating drum 18, to form a non-woven fabric.

The average fiber diameter of the fiber constituting the non-woven fabric and the deposition efficiency are shown in Table 3.

Example 7

Formation of Non-Woven Fabric (F2):

In the same manner as in Example 6 except that no blowing of air from the gas blowing nozzle 14 was carried out, the fiber was formed and such a fiber was accumulated on the polymer electrolyte membrane (MA1) to form a non-woven fabric (F2).

The average fiber diameter of the fiber constituting the non-woven fabric and the deposition efficiency are shown in Table 3.

TABLE 3

| | Average fiber diameter (μm) | Deposition efficiency (%) |
|---|---|---|
| Ex. 6 | 2.4 | 96 |
| Ex. 7 | Not formed | 0 |

INDUSTRIAL APPLICABILITY

The non-woven fabric made of an electrically conductive fiber obtained by the process of the present invention, is useful as a catalyst layer for a membrane/electrode assembly. And, such a membrane/electrode assembly is useful as a membrane/electrode assembly for a polymer electrolyte fuel cell which exhibits performance of a high energy efficiency and a high output density even under conditions of a low operation temperature, high current density and high gas utilization rate.

The entire disclosure of Japanese Patent Application No. 2008-268726 filed on Oct. 17, 2008 including specification, claims, drawings and summary are incorporated herein by reference in its entirety.

What is claimed is:

1. A process for producing a fiber by a spinning method which comprises:
   discharging n types of spinning solutions, wherein n is an integer of at least 2, of which at least one type comprises a fluorinated ion exchange resin and a solvent, simultaneously from discharge nozzles,
   and evaporating solvents from the discharged n types of spinning solutions, wherein the n types of spinning solutions, which are combined and spun by the spinning method, are stretched by a gas stream, and wherein at least two of the n types of spinning solutions are discharged from different discharge nozzles.

2. The process for producing a fiber according to claim 1, wherein at least one type of the spinning solutions comprises an electrically conductive material and a solvent.

3. The process for producing a fiber according to claim 2, wherein the electrically conductive material is a catalyst comprising a metal.

4. A process for producing an electrically conductive composite fiber by a spinning method, the process comprises:
   discharging n types of spinning solutions, wherein n is an integer of at least 2, of which at least one type comprises a fluorinated ion exchange resin and a solvent, and at least one type comprises an electrically conductive material and a solvent, simultaneously from discharge nozzles, and
   evaporating the solvents from the discharged n types of spinning solutions, wherein the n types of spinning solutions, which are combined and spun by the spinning method, are stretched by a gas stream, and wherein the n types of spinning solutions are discharged from n different discharge nozzles.

5. The process for producing an electrically conductive composite fiber according to claim 4, wherein the electrically conductive material is a catalyst comprising a metal.

6. A method for producing a catalyst layer for a membrane/electrode assembly for a polymer electrolyte fuel cell, which comprises accumulating the fiber produced by the process as defined in claim 3 to form a non-woven fabric, thereby obtaining a catalyst layer having the non-woven fabric.

7. A method for producing a catalyst layer for a membrane/electrode assembly for a polymer electrolyte fuel cell, which comprises accumulating the fiber produced by the process as defined in claim 5 to form a non-woven fabric, thereby obtaining a catalyst layer having the non-woven fabric.

8. The process for producing a fiber according to claim 1, wherein the gas stream is parallel or oblique to the direction of the spinning solutions from the discharge nozzles.

9. The process for producing a fiber according to claim 1, wherein the gas stream is pressurized.

10. The process for producing a fiber according to claim 1, wherein the gas stream is an inert gas stream.

11. The process for producing a fiber according to claim 1, wherein a blowoff amount of the gas stream is at least 0.5 L/min and at most 100 L/min.

12. The process for producing a fiber according to claim 4, wherein the gas stream is parallel or oblique to the direction of the spinning solution from the discharge nozzles.

13. The process for producing a fiber according to claim 4, wherein the gas stream is pressurized.

14. The process for producing a fiber according to claim 4, wherein the gas stream is an inert gas stream.

15. The process for producing a fiber according to claim 4, wherein a blowoff amount of the gas stream is at least 0.5 L/min and at most 100 L/min.

16. The process for producing a fiber according to claim 1, wherein the discharge nozzles are surrounded by a gas stream blowing nozzle.

17. The process for producing a fiber according to claim 16, wherein each of the nozzles discharge one of the n types of the spinning solutions, and wherein the nozzles are tubes.

* * * * *